United States Patent

[11] 3,607,110

| [72] | Inventors | Ernst Haas<br>Erlangen;<br>Joachim Martin, Erlangen; Konrad Reuschel, Pretzfeld; Norbert Schink, Erlangen; Carl-Heinz Vogel, Belecke-Mohne, all of, Germany |
|---|---|---|
| [21] | Appl. No. | 712,074 |
| [22] | Filed | Mar. 11, 1968 |
| [45] | Patented | Sept. 21, 1971 |
| [73] | Assignee | Siemens Aktiengesellschaft<br>Berlin, Germany |
| [32] | Priority | Mar. 11, 1967 |
| [33] | | Germany |
| [31] | | S 108776 IVc/12g |

[54] VACUUM APPARATUS FOR EXCLUDING CARBON IMPURITIES FROM A SILICON BODY
13 Claims, 2 Drawing Figs.

[52] U.S. Cl. .................................................. 23/273 SP,
23/301 SP, 55/208

[51] Int. Cl. ...................................................... B01j 17/10
[50] Field of Search .......................................... 23/273 SP,
301 SP; 55/74, 387, 389, 75, 208

[56] References Cited
UNITED STATES PATENTS

| 1,874,537 | 8/1932 | Cox .............................. | 55/387 |
|---|---|---|---|
| 3,116,764 | 1/1964 | Jepsen ........................... | 55/387 |
| 3,189,415 | 6/1965 | Emeis ............................ | 23/301 |

*Primary Examiner*—Norman Yudkoff
*Assistant Examiner*—S. Silverberg
*Attorneys*—Curt M. Avery, Arthur E. Willfond, Herbert L. Lerner and Daniel J. Tick ABSTRACT: Apparatus comprising means for capturing carbon-containing vapor emanating from carbon-containing substances in the high vacuum environment and in the equipment for producing the high vacuum in the environment, and adsorbent means for adsorbing the carbon-containing vapor.

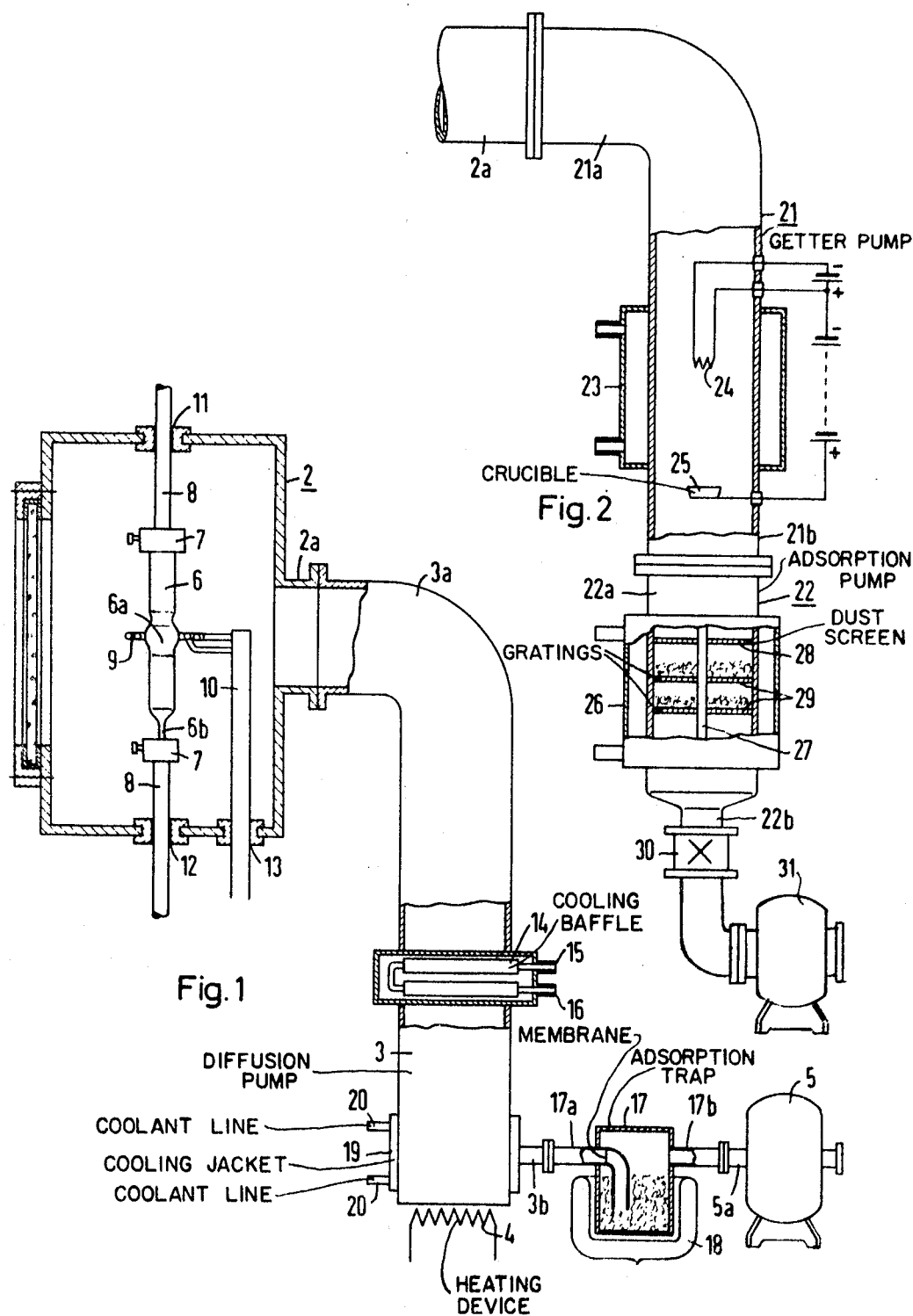

VACUUM APPARATUS FOR EXCLUDING CARBON IMPURITIES FROM A SILICON BODY

Our invention relates to method and apparatus for excluding carbon impurities from a silicon body.

Ra : silicon for producing electronic semiconductor members is deposited on a stationary heated support body frequently by employing a purely gaseous reducing agent, such as hydrogen particularly, for reducing and/or pyrolytically decomposing the vapor of a liquid silicon compound. The silicon produced generally in rod form usually contains carbon impurities originating from organic carbon compounds that are present in the liquid silicon compound. These carbon compounds have nearly the same boiling point as the liquid silicon compound and are therefore not separable therefrom by distillation. On the contrary, when the liquid silicon compound is vaporized, the carbon compounds pass into the vapor and decompose in the reaction chamber to form carbon which deposits with the silicon on the support body. Furthermore, silicon can, for example, absorb carbon when it is melted in a graphite crucible.

Carbon does not effect the conductivity or the type of conductivity of the silicon but can, however, retard the transformation of the deposited polycrystalline silicon into a monocrystal and give rise to dislocations during the formation of PN junctions in monocrystalline silicon. A reduction of the mean lifespan of the charge carriers due to the carbon is also probable.

Heretofore it has been considered pointless to employ the known crucible-free floating-zone melting process for removing carbon impurities from silicon because a distribution coefficient of about 1 is ascribed to the carbon in silicon. In fact, experiments have shown that the carbon content of a silicon rod proper could not be markedly reduced even by carrying out a great number of melting-zone passes through the rod.

It is accordingly an object of our invention, in spite of the heretofore contrary experience, to provide method and apparatus that effectively exclude carbon from silicon subjected to crucible-free floating-zone melting.

With the foregoing and other objects in view we provide, in accordance with our invention, method of excluding carbon impurities from a silicon body subjected to a crucible-free zone-melting process in a high vacuum environment, which comprises capturing and retaining the carbon-containing vapor emanating from carbon-containing substances such as lubricants in the high vacuum environment, and in equipment in the environment, e.g. the oil in the preliminary pump.

We also provide in accordance with our invention, apparatus for carrying out the foregoing method comprising means for capturing and retaining the carbon-containing vapor emanating from carbon-containing substances in the equipment for producing the high vacuum and in the high-vacuum chamber proper.

In accordance with other features of our invention, the apparatus comprises a receptacle wherein holders for the silicon body as well as a heating device for producing the melting zone in the silicon body are disposed. An exhaust duct is connected between the receptacle and pumping apparatus for producing the high vacuum in the receptacle, the pumping apparatus comprising a diffusion pump and a preliminary pump. A cooling baffle is connected in the exhaust duct between the receptacle and the pumping apparatus and is traversed by a coolant having a temperature of at least 20° C. below zero (−20° C.).

According to yet another feature of our invention, and in order to minimize even further the amount of carbon retained in the silicon body, an adsorption trap is connected between the diffusion pump and the preliminary pump of the pumping apparatus.

In accordance with an alternate feature of our invention, the pumping apparatus comprises a getter pump and an adsorption pump connected to the getter pump at a side thereof away from the receptacle. Furthermore, a preliminary pump is connected to the adsorption pump at a side thereof away from the getter pump.

Other features which are considered as characteristic for the invention are set forth in the appended claims.

Although the invention is illustrated and described herein as method and apparatus for excluding carbon impurities from a silicon body, it is nevertheless not intended to be limited to the details shown, since various modifications in the method and structural changes in the apparatus may be made without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a longitudinal view partly diagrammatic and partly in section of apparatus for excluding carbon from silicon by a crucible-free floating-zone melting process which includes pumping apparatus having a diffusion pump and a preliminary pump connected downstream thereof; and FIG. 2 is a longitudinal view partly diagrammatic and partly in section of another embodiment of the pumping apparatus of FIG. 1 which includes a getter pump, and an adsorption pump and a preliminary pump connected downstream thereof.

Referring now to the drawing and first particularly to FIG. 1 thereof, there is shown an exhaust duct 2a communicating with a receptacle 2 provided with an observation window. The exhaust duct 2a is flanged to a suction duct 3a which is connected to a diffusion pump 3 provided with a heating device 4 and a cooling jacket 19. A coolant line 20 continuously supplies liquid coolant to the cooling jacket 19. Carbon impurities in the form of gas molecules that passing into the diffusion pump 3 are heated by the heating device and caused to diffuse toward the walls of the diffusion pump 3 on which they deposit due to the low temperature thereat provided by the cooling jacket 19. A cooling baffle 14 is inserted in the suction duct 3a between the receptacle 2 and the diffusion pump 3 and is provided with an inlet tube 15 and an outlet tube 16 for a suitable coolant medium which should have a temperature of at least 20° C. below zero (−20° C.). Liquid nitrogen is particularly suitable as the coolant medium.

The diffusion pump 3 has an exhaust duct 3b which is flanged to an inlet duct 17a of an adsorption trap 17, and the trap 17 has an exhaust duct 17b which is, in turn, flanged to a suction inlet duct 5a of a preliminary pump 5. The adsorption trap 17 can be filled with molecular sieves, such as Linde molecular sieves known under the trademark "Linde 13X," for example. These molecular sieves consist of bodies of natural zeolite or artificial zeolite (permutite). Compact activated carbon is also suitable as a filling for the adsorption trap. It is, however, desirable when employing activated carbon as filling, to provide a membrane having fine pores between the suction inlet duct 17a of the trap 17 and the activated carbon. This membrane can be formed of a plastic material having a polyvinyl chloride base with a pore size equal to or smaller than $0.5\mu$ or can be formed of VA steel having a pore size equal to or smaller than $5\mu$. Thus it is impossible for activated carbon to get into the diffusion pump 3 and the receptacle 2. The adsorption trap 17 is located in a Dewar flask 18 which can be filled with liquid nitrogen, for example, for cooling the trap. The preliminary pump 5 can be an ordinary piston pump, rotary displacement pump, rotary-slider pump or rotary-piston pump.

A silicon rod 6 with a monocrystalline seed crystal 6b fused thereto are retained in holders 7 mounted on shafts 8 within the receptacle 2. The shafts 8 are guided in seals 11 and 12 which are located in openings formed in the receptacle walls. A melting zone 6a is produced in the silicon rod 6 by an induction heating coil 9 energized with a high-frequency alternating current and secured to a holder portion 10. The heating coil 9 and the semiconductor rod 6 are relatively movable in the axial direction of the rod 6 for passing the melting zone 6a in an upward direction through the rod 6 as shown in FIG. 1. The coil holder portion 10 extends through a seal 13 located in an opening of a receptacle wall.

The exclusion of carbon from the silicon rod 6 during a crucible-free floating-zone pulling operation in an evacuated receptacle 2 is effected also by means of the pumping apparatus shown in FIG. 2, which includes a getter pump 21 and an adsorption pump 22. The getter pump 21 has a suction inlet duct 21a which is flanged to the discharge duct 2a extending from the receptacle 2 which houses the zone-melting equipment shown in FIG. 1. The getter pump 21 has an exhaust duct 21b which is, in turn, flanged to a suction inlet duct 22a of the adsorption pump 22. The getter pump 21 is surrounded by a cooling jacket 23 and includes an incandescent cathode 24 and a crucible 25 which is heated by electron bombardment from the incandescent cathode 24. Nonillustrated titanium wire continually introduced into the crucible 25 is accordingly vaporized. The titanium vapor thus produced entrains carbon impurities in the form of the gas molecules that are present and deposits on the cooled inner wall of the pump 22 with the gas molecules adhering thereto.

The adsorption pump 22 also has a cooling jacket 26 advantageously traversed by liquid nitrogen. In the adsorption pump 22 there is mounted a support 27 carrying a dust screen 28 as well as gratings 29 on which the adsorption medium, such as molecular screens "Linde 13X," for example, are disposed. Gaseous carbon impurities that pass into the adsorption pump are thus adsorbed by the adsorption medium if they should pass through the dust screen 28 or any of the gratings 29. A nonillustrated electrical heating device can be located within the support 27 for regenerating the adsorption medium. A ventilating valve 30 is connected in an outlet duct 22b extending from the adsorption pump 22. A preliminary pump 31 similar to pump 5 of FIG. 1 is connected to the outlet duct 22b extending from the adsorption pump 22. The valve 30 is located in the suction duct between the adsorption pump 22 and the preliminary pump 31.

It is desirable, in order to reduce the carbon content in the silicon rod 6 by zone-melting, to provide the bearing parts of the displaceable members of the holder or support devices of the heating device, that is the bearing parts of the shaft 8 in the seals 11 and 12, as well as the bearing parts of the coil support portion 10 in the seal 13, with a lubricant having a low vapor pressure. Silicon grease, inorganic lubricant such as molybdenum sulfide and/or tungsten diselenide as well as graphite are suitable lubricants for this purpose.

Experiments have shown that a polycrystalline silicon rod transformed to a monocrystal had an overall carbon content of 38 p.p.m. after five passes of the melting zone therethrough in a zone-melting operation performed with apparatus as shown in FIG. 1, but without the cooling baffle 14 or the adsorption trap 17. On the other hand, a monocrystalline silicon rod produced from a polycrystalline silicon rod made together with the first-mentioned polycrystalline rod in the same precipitation apparatus and having the same dimensions, had a carbon content of only 11 p.p.m. at a location thereof 5 cm. from the seed crystal after being subjected to a single pass of the melting zone therethrough in a zone-melting apparatus provided with the cooling baffle and adsorption trap according to our invention, as shown in FIG. 1.

It is noted with regard to the foregoing that vapors containing carbon, which stem from the oil or grease in the glide members or bearings and from the pump system which produces and maintains the vacuum in the vacuum chamber wherein the zone-melting process is performed, condense in the cooling baffle 14 and are adsorbed in the adsorption trap 17 of the adsorption pump 22.

We claim:

1. Apparatus for excluding carbon impurities from a silicon body through which a melting zone is being passed within a high vacuum chamber, comprising means for capturing and means for retaining carbon-containing vapor emanating from carbon-containing substances in the vacuum chamber and means for producing the high vacuum, said vacuum-producing means being a pumping apparatus comprising a diffusion pump and a preliminary pump serially connected to said chamber, and a cooling baffle interposed between said chamber and said pumping apparatus and traversed by a coolant having a temperature of at least −20° C., and including an adsorption trap connected between said diffusion pump and said preliminary pump, said adsorption trap having a suction inlet duct communicating with said diffusion pump, and said adsorption trap being filled with compact activated carbon, and including a membrane having fine pores disposed between said inlet duct of said adsorption trap and said activated carbon.

2. Apparatus for crucible-free, floating-zone melting rods of silicon comprising a treatment chamber, holder means mounted in said chamber for holding therein a silicon rod to be treated, an induction heating coil mounted in said chamber so as to surround the silicon rod and form a molten zone therein, said heating coil and said holder means being relatively movable in axial direction thereof so as to pass the molten zone through the rod and at least two serially connected vacuum pumps operatively connected to said chamber, including a diffusion pump and a preliminary pump, a first cooling baffle interposed between said chamber and said diffusion pump, and a second cooling baffle interposed between said diffusion pump and said preliminary pump, said second cooling baffle being filled with adsorbent material for retaining carbon-containing vapor.

3. Apparatus according to claim 2, wherein said chamber has walls formed with openings in which bearing seals are disposed, said holder means mounted in said chamber on respective displaceable shafts extending out of said chamber respectively through one of said bearing seals, said induction heating coil being mounted in said chamber on a displaceable support extending out of said chamber through one of said bearing seals, said shafts and said support being relatively displaceable in the axial direction thereof for passing through the silicon body the melting zone formed in the silicon body by said heating coil, the portions of said shafts and said support bearing in said bearing seals being provided with a lubricant having a relatively low vapor pressure.

4. Apparatus according to claim 3, wherein said lubricant is a substance selected from the group consisting of silicon grease, molybdenum sulfide, tungsten diselenide and graphite.

5. Apparatus according to claim 3, wherein said lubricant is an inorganic lubricant.

6. Apparatus according to claim 2 wherein said cooling baffles are traversed by a coolant having a temperature of at least −20° C.

7. Apparatus according to claim 6, wherein said coolant is liquid nitrogen.

8. Apparatus according to claim 2, wherein said adsorption trap is filled with molecular sieves.

9. Apparatus for crucible-free, floating-zone melting rods of silicon comprising a treatment chamber, holder means mounted in said chamber for holding therein a silicon rod to be treated, an induction heating coil mounted in said chamber so as to surround the silicon rod and form a molten zone therein, said heating coil and said holder means being relatively movable in axial direction thereof so as to pass the molten zone through the rod, and a plurality of serially connected vacuum pumps operatively connected to said chamber including a getter pump directly connected to said chamber and including a cooled adsorption pump directly connected to said getter pump, said adsorption pump being filled with adsorbent material for retaining carbon-containing vapor.

10. Apparatus according to claim 9, including means for cooling said adsorption pump with liquid nitrogen.

11. Apparatus according to claim 9, wherein said chamber has walls formed with openings in which bearing seals are disposed, said holder means mounted in said chamber on respective displaceable shafts extending out of said chamber respectively through one of said bearing seals, said induction heating coil being mounted in said chamber on a displaceable support extending out of said chamber through one of said bearing seals, said shafts and said support being relatively displaceable in the axial direction thereof for passing through the silicon body the melting zone formed in the silicon body by said heating coil, the portions of said shafts and said support bearing in said bearing seals being provided with a lubricant having a relatively low vapor pressure.

12. Apparatus according to claim 11, wherein said lubricant is a substance selected from the group consisting of silicon grease, molybdenum sulfide, tungsten diselenide and graphite.

13. Apparatus according to claim 11, wherein said lubricant is an inorganic lubricant.